Patented Nov. 23, 1943

2,334,743

UNITED STATES PATENT OFFICE 2,334,743

MANUFACTURE OF CHROMANE COMPOUNDS

Robert Behnisch, Wuppertal-Elberfeld, Germany, assignor to Winthrop Chemical Company, Inc., New York, N. Y., a corporation of New York No Drawing. Application June 19, 1940, Serial No. 341,315. In Germany May 27, 1939

12 Claims. (Cl. 260—333)

This invention relates to the manufacture of chromane compounds and to certain products obtainable by such manufacture.

In accordance with the present invention chromane compounds which are like or similar to vitamin-E are obtained by converting monovalent phenols having a free para-position, particularly 2,3,5-trimethylphenol, into 2-methyl-2-(4',8',12'-trimethyl-tridecyl)-chromanes having an unsubstituted 6-position by the action of a phytylhalide advantageously in the presence of an acid condensing agent such as zinc- and aluminium chloride, coupling the said chromane compound with a reactive diazonium salt to form an azodyestuff, reducing the latter to the corresponding amine and if desired converting the aminogroup of the 2-methyl-2-(4',8',12'-trimethyl-tridecyl)-6-amino-chromane into the hydroxyl group by diazotizing and boiling of the diazo compound in aqueous solution. The benzene ring of the chromane compound thus obtainable is substituted by methyl groups in other positions than the 6-position when starting with methyl-substituted mono-valent phenols having a free para-position. Substances having a strong tendency of coupling, for instance those obtainable by diazotizing nitraniline, di- or trinitraniline and the like are preferably used as diazonium compound. The reduction of the azo compound is performed according to the methods usual for this purpose, preferably by catalytic hydrogenation, for instance by using platinum, palladium or nickel as catalysts. The conversion of the amino group into the hydroxyl group by diazotizing and boiling of the diazo compound in aqueous solution advantageously is performed while excluding oxygen, for instance while introducing a nitrogen current into the mixture. If excess nitrite, for instance amylnitrite, is present in the reaction mixture, catalysts such as copper or copper sulfate which normally are used when replacing the diazo group by the hydroxyl group by boiling in aqueous solution, should not be present in order to avoid an oxidation of the reaction product.

The final products thus obtainable as well as the intermediate containing the amino group in the 6-position have a curing effect upon the resorption sterility of female rats which are sterile on account of insufficient feeding with vitamin-E.

The invention is furthermore illustrated by the following example, without being restricted thereto:

Example 1.4 grams of 2,3,5-trimethylphenol, 4 grams of phytylbromide and 1 gram of waterfree zinc chloride are heated to 70° C. in 30 ccm. of ligroin for one and a half hour while stirring and introducing a nitrogen current. The at first vigorous development of hydrogen bromide has then ceased. After cooling the reaction mixture is diluted with petroleum ether, mixed with water and shaken thoroughly. After separating the aqueous layer the petroleum ether ligroin layer is shaken several times with diluted sodium hydroxide solution and then with water, dried with sodium sulfate, filtered and evaporated. The residue distills after slight fore-runnings at a temperature of 215-218° C. in the airbath under 0.5 mm. pressure as a light yellow oil. The 2,5,7,8-tetramethyl-2-(4',8',12'-trimethyl-tridecyl)-chromane thus obtained has an absorption maximum at about 280-285 m$\mu$.

1 gram of this compound is mixed up by stirring with 10 ccm. of glacial acetic acid. The mixture is treated slowly with a solution of 2,4-dinitrobenzene-diazoniumsulfate in glacial acetic acid, produced as usual by diazotizing of 2 grams of 2,4-dinitraniline with amyl nitrite. While forming an azodyestuff, the reaction mixture becomes at once dark red. After standing for some time at room temperature the separated dyestuff is sucked off and washed with alcohol. A second precipitation may still be obtained from the mother lye by adding alcohol. It is sucked off and the dyestuff is then dissolved in 15 ccm. of ether. Small quantities of a yellow-brown powder remain undissolved and are filtered off. The filtrate is concentrated to half of its volume and carefully mixed with alcohol, whereupon the dyestuff precipitates as a fine red powder. It is sucked off after standing for a short time in the refrigerator, washed with alcohol and dried in the exsiccator. It represents a red powder which is readily soluble in ether and acetic ester, less soluble in glacial acetic acid and alcohol.

0.61 gram of this azodyestuff are suspended in 30 ccm. of glacial acetic acid and are hydrogenized catalytically after the addition of 0.3 gram of a 20% palladium catalyst at 20° C. In the course of 4 hours the calculated 200 ccm. of hydrogen are taken up, whereupon the dark red solution becomes light yellow at the end of the hydrogenation. The catalyst is filtered off with the exclusion of air and the filtrate is evaporated to dryness under reduced pressure. The residue is treated with 50 ccm. of water, and 100 ccm. of petroleum ether, the petroleum ether layer is still shaken three times with water after separation of the aqueous layer, then dried with sodium sulfate and evaporated. The residue, a brown oil, distils at 210–220° C. under 0.1–0.2 mm. pressure as a light yellow oil. The compound has an absorption spectrum similar to that of α-tocopherol, the maximum of the absorption being somewhat shifted to the longer wave length, namely to about 311 mμ. In a dose of about 5 mgs. it has a curing effect on the resorption sterility of the rat.

0.4 gram of 6-amino-2,5,7,8-tetramethyl-2-(4',8',12'-trimethyl-tridecyl)-chromane are dissolved in 25 ccm. of glacial acetic acid and the solution is diazotized with amyl nitrite while cooling. After the addition of some drops of concentrated sulfuric acid the solution is stored for some time at room temperature. Then the glacial acetic acid solution of the diazoniumsulfate thus formed is dropped into boiling diluted sulfuric acid while introducing at the same time nitrogen. The solution is still boiled for a short time, then cooled and shaken out twice with petroleum ether. The united petroleum ether extracts are shaken out with water, dried with sodium sulfate and evaporated. The residue, a brown oil, is distilled in the vacuum. The 6-oxy-2,5,7,8-tetramethyl-2-(4',8',12'-trimethyl-tridecyl)-chromane distils at first as a brown, at a second distillation as a light yellow oil at a temperature of 200° C. in the airbath under 0.1 mm. pressure. It reduces methylalcoholic silver nitrate solution and has an absorption maximum at 295 mμ.

The transformation of the 6-amino group by way of the diazo group into the hydroxyl group may be performed also in the following manner:

1 gram of 6-amino-2,5,7,8-tetramethyl-2-(4',8',12'-trimethyl-tridecyl)-chromane is dissolved in 25 ccm. of glacial acetic acid. The solution is mixed with 3 ccm. of 20% sulfuric acid and diazotized at 10° C. by adding slowly 2.5 ccm. of a normal sodium nitrite solution while stirring. The mixture is still stirred for 10 minutes and the slight excess of nitrous acid is destroyed by adding somewhat sulfamic acid. The clear solution of the diazonium compound is dropped into 100 ccm. of boiling 35% sulfuric acid while introducing a nitrogen current. A yellow-brown oil separates while nitrogen is developed which is dissolved in petroleum ether after cooling. The petroleum ether solution is extracted several times with water and dried by means of sodium sulfate. The petroleum ether is evaporated and the residue is distilled in vacuo. The 6-oxy-2,5,7,8-tetramethyl-2-(4',8'12'-trimethyl-tridecyl)-chromane distils as a yellow oil. It has the same properties as indicated above.

No claims are made herein to acylamino chromanes or the manufacture of the same since such are described and claimed in my co-pending application Serial No. 341,315 also filed on June 19, 1940.

I claim:

1. The process which comprises reacting upon a mono-hydroxy-benzene having a free para-position with a phytylbromide in the presence of an acid condensing agent, coupling the 2-methyl-2-(4',8',12'-trimethyl-tridecyl)-chromane formed with a reactive diazonium salt and reducing the azo compound obtained to the corresponding 2-methyl-2-(4',8',12'-trimethyl-tridecyl)-6-amino-chromane.

2. The process which comprises reacting upon 2,3,5-trimethyl phenol with a phytylbromide in the presence of an acid condensing agent, coupling the 2,5,7,8-tetramethyl-2-(4',8',12'-trimethyl-tridecyl)-chromane formed with a reactive diazonium salt and reducing the azo compound obtained to the corresponding 2,5,7,8-tetramethyl-2-(4',8',12'-trimethyl-tridecyl)-6-amino-chromane.

3. The process which comprises reacting upon a mono-hydroxy-benzene having a free para-position with a phytylbromide in the presence of an acid condensing agent, coupling the 2-methyl-2-(4',8',12'-trimethyl-tridecyl)-chromane formed with a nitro-benzene diazonium salt and reducing the azo compound obtained to the corresponding 2-methyl-2-(4',8',12'-trimethyl-tridecyl)-6-amino-chromane.

4. The process which comprises reacting upon a mono-hydroxy-benzene having a free para-position with a phytylbromide in the presence of an acid condensing agent, coupling the 2-methyl-2-(4',8',12'-trimethyl-tridecyl)-chromane formed with a reactive diazonium salt and reducing the azo compound obtained to the corresponding 2-methyl-2-(4',8',12'-trimethyl-tridecyl)-6-amino-chromane by catalytic hydrogenation.

5. The process which comprises reacting upon a mono-hydroxy-benzene having a free para-position with a phytylbromide in the presence of anhydrous zinc chloride, coupling the 2-methyl-2-(4',8',12'-trimethyl-tridecyl)-chromane formed with a reactive diazonium salt and reducing the azo compound obtained to the corresponding 2-methyl-2-(4',8',12'-trimethyl-tridecyl)-6-amino-chromane.

6. The process which comprises reacting upon 2,3,5-trimethyl phenol with phytylbromide in the presence of an acid condensing agent, coupling the 2,5,7,8-tetramethyl-2-(4',8',12'-trimethyl-tridecyl)-chromane formed with a nitro-benzene diazonium salt and reducing the azo compound obtained to the corresponding 2,5,7,8-tetramethyl-2-(4',8',12'-trimethyl-tridecyl)-6-amino-chromane.

7. The process which comprises reacting upon 2,3,5-trimethyl phenol with phytylbromide in the presence of an acid condensing agent, coupling the 2,5,7,8-tetramethyl-2-(4',8',12'-trimethyl-tridecyl)-chromane formed with a reactive diazonium salt and reducing the azo compound obtained to the corresponding 2,5,7,8-tetramethyl-2-(4',8',12'-trimethyl-tridecyl)-6-amino-chromane by catalytic hydrogenation.

8. The process which comprises reacting upon 2,3,5-trimethyl phenol with phytylbromide in the presence of an acid condensing agent, coupling the 2,5,7,8-tetramethyl-2-(4',8',12'-trimethyl-tridecyl)-chromane formed with a nitro-benzene diazonium salt and reducing the azo compound obtained to the corresponding 2,5,7,8-tetramethyl-2-(4',8',12'-trimethyl-tridecyl)-6-amino-chromane by catalytic hydrogenation.

9. The process which comprises reacting upon 2,3,5-trimethyl phenol with phytylbromide in the presence of anhydrous zinc-chloride, coupling the 2,5,7,8-tetramethyl-2-(4',8',12'-trimethyl-tridecyl-(chromane formed with a nitro-benzene diazonium salt and reducing the azo compound obtained to the corresponding 2,5,7,8-tetramethyl-2-(4',8',12'-trimethyl-tridecyl)-6-amino-chromane.

10. The process which comprises reacting upon 2,3,5-trimethyl phenol with phytylbromide in the presence of anhydrous zinc-chloride, coupling the 2,5,7,8-tetramethyl-2-(4',8',12'-trimethyl-tridecyl-(chromane formed with a nitro-benzene diazonium salt and reducing the azo compound obtained to the corresponding 2,5,7,8-tetramethyl-2-(4',8',12'-trimethyl-tridecyl)-6-amino-chromane by catalytic hydrogenation.

11. In a process for making chromane compounds, the steps which comprise coupling a 2-methyl-2-(4',8',12'-trimethyl-tridecyl)-chromane with a reactive diazonium salt and reducing the azo compound thus formed to the corresponding 2-methyl-2-(4',8',12'-trimethyl-tridecyl)-6-amino chromane.

12. In a process for making chromane compounds, the steps which comprise coupling 2,5,7,8-tetramethyl-2-(4',8',12'-trimethyl-tridecyl)-chromane with a reactive diazonium salt and reducing the azo compound thus formed to the corresponding 6-amino-2,5,7,8-tetramethyl-2-(4',8',12'-trimethyl-tridecyl)-chromane.

ROBERT BEHNISCH.